Nov. 8, 1927.
A. ROTH ET AL
1,648,784
AUTOMOBILE ATTACHMENT
Filed Oct. 23, 1925     3 Sheets-Sheet 1
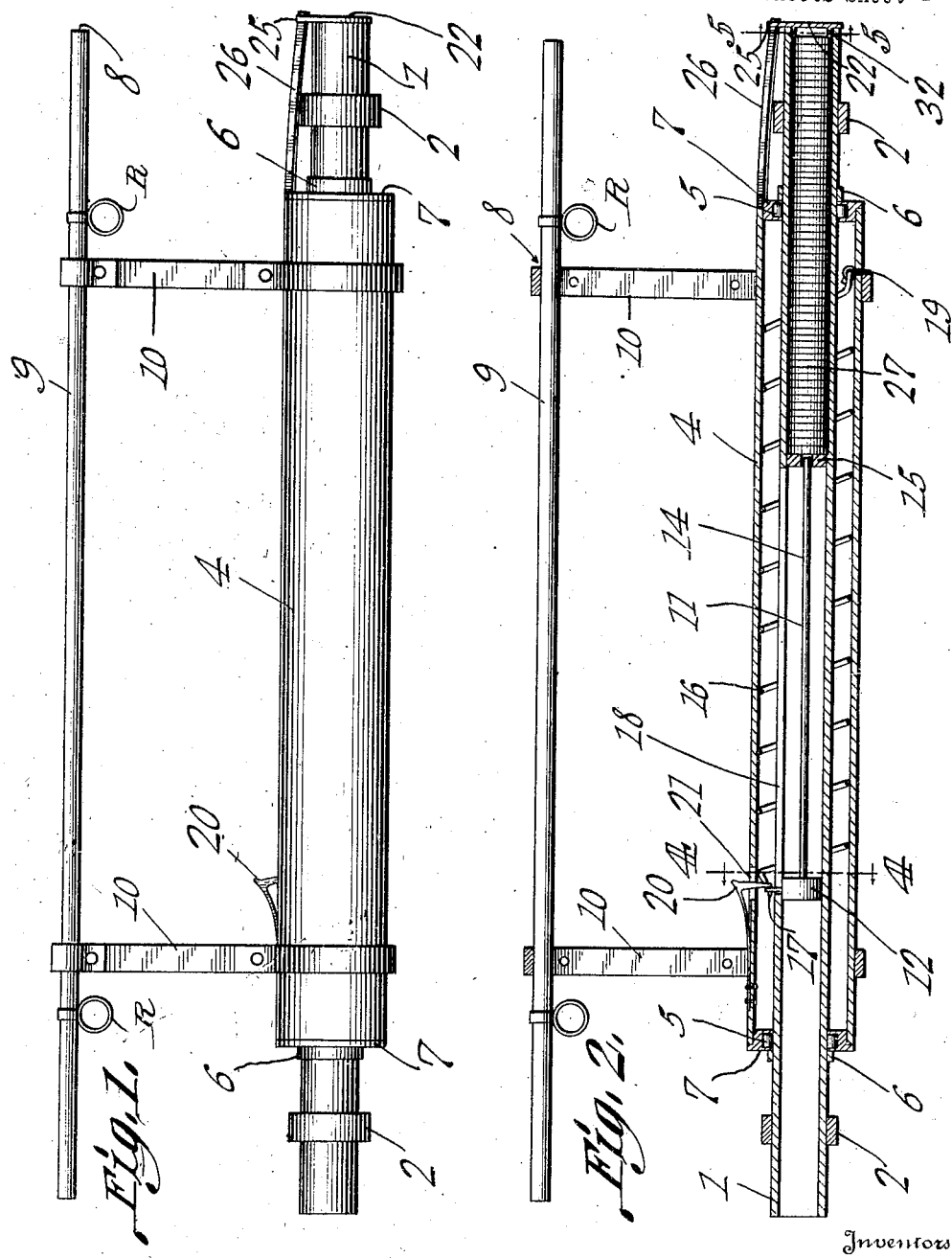
Inventors
A. Roth
J. W. Roth

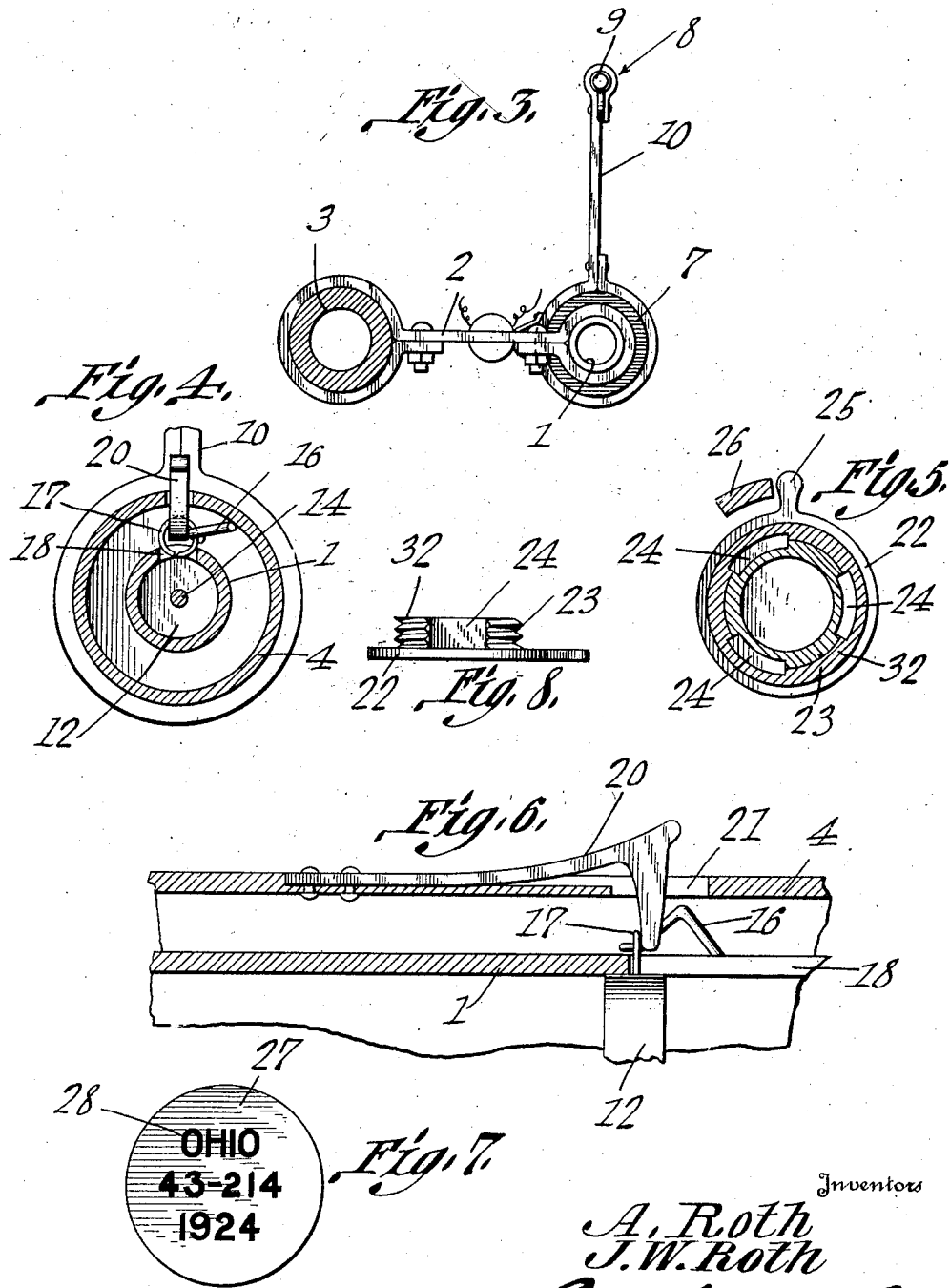

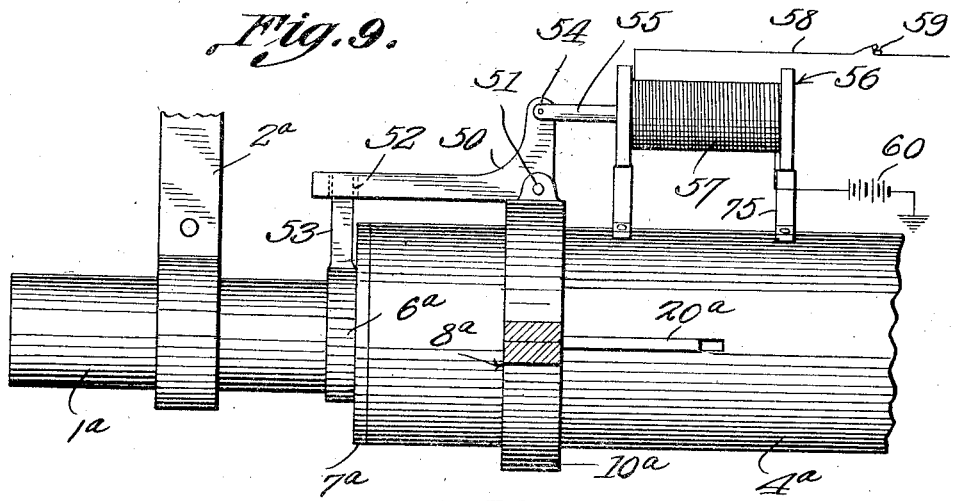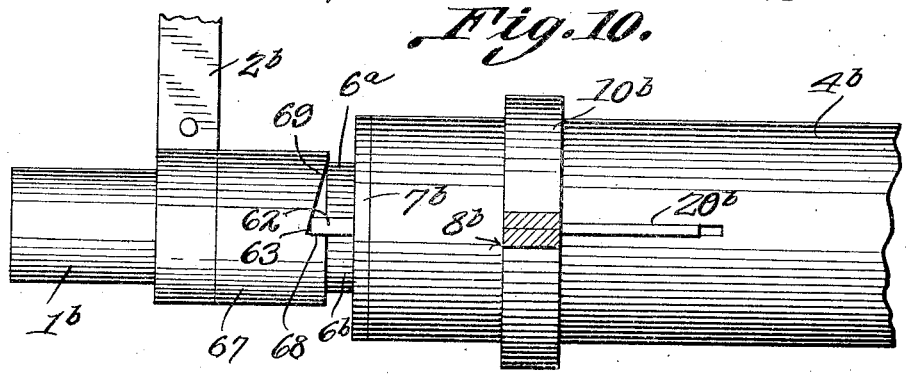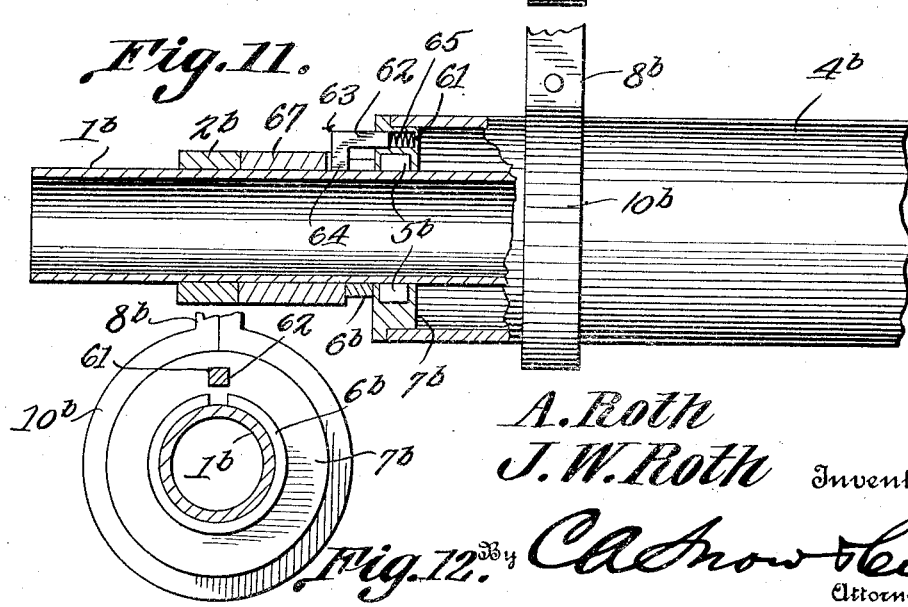

Patented Nov. 8, 1927.

1,648,784

UNITED STATES PATENT OFFICE.

ANTHONY ROTH AND JOSEPH W. ROTH, OF NEW BRUNSWICK, NEW JERSEY.

AUTOMOBILE ATTACHMENT.

Application filed October 23, 1925. Serial No. 64,421.

This invention aims to provide novel means whereby, when an automobile strikes a pedestrian, a plurality of disks will be discharged upon the highway, the disks being so marked as to identify the automobile and its driver, the supposition being that, in his haste to escape, the driver will not tarry long enough to pick up all of the disks, and it being possible, by means of any disks remaining on the highway to identify the car which has done the damage.

It is within the province of the disclosure to improve generally and to enhance the utility of devices of that sort to which the invention appertains.

Although a preferred form has been shown in the drawings, it will be understood that a mechanic, working within the scope of what is claimed, may make changes or alterations, without departing from the spirit of the invention.

In the accompanying drawings:—

Figure 1 shows, in front elevation, a device constructed in accordance with the invention, parts being in section; Figure 2 is a longitudinal sectional view of the structure depicted in Figure 1; Figure 3 is an end elevation, wherein the fender appears in section; Figure 4 is a transverse section on the line 4—4 of Figure 2; Figure 5 is a transverse section on the line 5—5 of Figure 2; Figure 6 is a fragmental longitudinal section showing the means whereby the plunger or ejector is held releasably retracted; Figure 7 is a plan showing one of the disks; Figure 8 is a view wherein the closure or the barrel is seen edgewise; Figure 9 is an elevation showing a modification; Figure 10 is an elevation showing another modification; Figure 11 is a view showing the device delineated in Figure 9, parts being in section; Figure 12 is a cross section of the structure shown in Figures 10 and 11.

The device forming the subject matter of this application comprises a tubular barrel 1 held by brackets 2 on the front fender 3 of an automobile, or upon any other accessible portion of the vehicle, at the front thereof. As shown in Figure 3, the barrel 1 is located directly behind the fender 3. A tubular casing 4 is disposed about the barrel 1 and is shorter than the barrel, the casing comprising ends 7 carrying roller bearings 5 cooperating with the barrel, the casing thus being journaled for rotation on the barrel. Collars 6 are mounted on the barrel 1, and, coacting with the ends 7 of the casing 6, prevent the casing from moving longitudinally on the barrel. The casing 4 comprises what, considering the way in which the device operates, may be denominated a crank arm 8, said arm including a rail 9 disposed parallel to the axis of the casing 4 and held on the casing by rigid connections 10. Referring to Figure 3, the reader should understand that the rail 9 is located at a higher elevation than the fender 3 and is disposed slightly to the rear of the fender. The object in this construction is, that the fender 3 may bump into vehicles and like objects, without causing the rail 9 to strike such objects. When, however, the fender 3 hits a human being, the human being will tend to topple over rearwardly and strike the rail 3, thereby imparting rotation to the casing 4, for a purpose which will be made manifest hereinafter.

An ejector is mounted for reciprocation in the barrel 1, the ejector being shown in the form of a plunger 11 comprising a head 12 and a stem 14, the head fitting closely but slidably in the barrel 1, and the stem being mounted to reciprocate in a guide 15 fixed within the barrel. A retractile spring 16 constitutes means for advancing the plunger 11, the spring being disposed about the barrel 1, within the casing 4. One end of the spring 16 is attached to a securing element 17 carried by the head 12 and movable in a longitudinal slot 18 which is fashioned in the barrel 1. The outer end of the spring 16 is secured at 19 to the casing 4. With a view to holding the plunger 11 retracted, a spring latch 20 is secured at one end to the casing 4 on the exterior thereof, the latch projecting inwardly through an opening 21 in the casing 4, and being adapted to engage the securing element 17, which may be considered to be a part of the plunger 11.

A closure 22 for one end of the barrel 1 is provided, and has a neck 32 which is threaded at 23 into the barrel 1. The threads 23 of the neck 32 and of the barrel 1 are interrupted, as shown at 24 so that when the closure has been rotated through a predetermined arc, the closure may be separated readily from the barrel. In order to secure a rotation of the closure 22, to the end that it may be separated from the barrel 1, the closure is supplied with an outstanding finger 25 located in the path of a projection 26 extended from the end of the barrel 1.

A large number of disks 27 are located between the closure 22 and the guide 15, the guide thus serving as an abutment for the disks. The disks 27 are marked, as indicated at 28, in any suitable way which will identify the car. Thus, following a common practice, the disks may carry the name of a State, the number of a license, and the year in which the license was issued. The closure 22 may also be marked as shown at 28, Figure 7 illustrating this feature sufficiently.

In practical operation, the plunger 11 is retracted, the spring 16 being extended, and the latch 20 being engaged with the part 17, to hold the plunger retracted, as shown in Figure 2, a crank arm 8 standing upright, as shown in Figure 3, and the disks 27 being in place.

Because the rails 9, which form part of the crank arm 8, is disposed above and to the rear of the fender 3, the fender 3 may be bumped against vehicles and the like, without operating the device. When, however, a human being is struck, and topples rearwardly, into engagement with the rail 9, the rail 9 and the connections 10 rotate the casing 4 on the barrel 1 until the latch 20 is disengaged from the plunger 11, and, at the same time, the projection 26 on the barrel 4, cooperates with the finger 25 on the closure 22, rotates the closure until the interrupted portions 24 of the threads 23 of the closure and of the barrel 1 are so located that the closure 22 may slip readily off the barrel 1, to the right in Figure 2. When the plunger 11 is released, as aforesaid, the plunger is advanced by the spring 16 and shoots out the disks 27, along with the closure 22, the parts being dispersed far and wide, over the surface of the highway. It is obvious that the driver of a vehicle, being desirous of escaping quickly, will not stay long enough to pick up all of the disks 27, and, consequently, any disks, remaining on the highway, will serve as a tell-tale whereby the vehicle may be identified.

In the form shown in Figure 9, of the drawing, parts hereinbefore described have been designated by numerals previously used, with the suffix "a".

In Figure 9, the connection 10ª of the crank arm 8ª is used as a support for a bell crank lever or latch 50 extended longitudinally of the casing 4ª and fulcrumed at 51 on the part 10ª for swinging movement. The latch 50 is provided with a seat 52 adapted to cooperate with a radial keeper 53 on one of the collars 6ª that are carried by the barrel 1ª. The outstanding arm of the bell crank lever or latch 50 is pivoted at 54 to a core 55 of a solenoid magnet 56 supported at 75 on the casing 4ª. The winding 57 of the solenoid magnet 56 is interposed in the ignition circuit 58 of the vehicle, the usual switch 59 and the common source 60 of electrical energy being interposed likewise in said circuit.

Whilst the vehicle is in operation, the circuit 58 is closed by the switch 59 and the solenoid magnet 56 is energized, the core 55 being retracted, and the bell crank lever or latch 50 being swung on its fulcrum 51, so that the seat 52 of the bell crank lever or latch is not engaged with the keeper 53. The device, under such circumstances, may operate in the way hereinbefore explained. When, however, the switch 59 is open, to open the ignition circuit 58, the solenoid magnet 56 is de-energized, and the bell crank latch 50 engages with the keeper 53. The casing 4ª then cannot rotate on the barrel 1ª, and the device, as a consequence, cannot be operated to throw out the disks 27 whilst the vehicle is standing still.

The device shown in Figure 9 provides a means under the control of an operator, and operating electrically, for preventing an accidental actuation of the device whilst the vehicle is standing still. This result may also be brought about by mechanical means, as disclosed in Figures 10, 11 and 12 of the drawings. In those figures, parts hereinbefore described have been designated by numerals previously used, with the suffix "b".

One of the end members 7ᵇ of the casing 4ᵇ has a recess 61 in which reciprocates one arm 62 of an angular latch 63 including an inwardly extended arm 64. A compression spring 65 is mounted in the recess 61 and tends to slide the latch 63 outwardly, out of a seat 66 which is formed in one of the collars 6ᵇ on the barrel 1ᵇ. A keeper 67, in the form of a sleeve, is mounted to rotate on the barrel 1ᵇ between one of the collars 6ᵇ and the corresponding part 2ᵇ. In its ends, the keeper 67 has a recess formed by a longitudinal shoulder 68 and an inclined cam edge 69.

When the latch 63 is forced outwardly by the action of the spring 65, the inwardly extended arm 64 of the latch is received in the recess in the sleeve 67, formed by the shoulder 68 and the inclined cam edge 69. The arm 64 of the latch 63 then is disengaged from the seat 66 in the collar 6ᵇ on the barrel 1ᵇ, and the casing 4ᵇ can be rotated on the barrel. In order to lock the device, so that it cannot be operated accidentally when the car is standing still, the keeper or sleeve 67 is rotated, whereupon the cam edge 69 of the sleeve will engage the arm 64 of the latch 63 and force the latch to the right in Figure 10, the spring 65 being compressed, and the latch 63 being held in the position to which it has been moved, because the arm 64 of the latch will be engaged with the inner edge of the rotatable keeper 67. When the latch 63 is moved to the right in Figure 10, as aforesaid, the arm 64 of the latch 63 will enter the keeper 67 in the collar 6$^b$ that is attached to the barrel 1$^b$, and the casing 4$^b$ cannot rotate on the barrel.

If desired, the part 9 may carry reflectors R, so located that they will be illuminated at night to show whether or not the part 9 is in proper position, and to show whether or not the device is set and in condition for operation.

Having thus described the invention, what is claimed is:—

1. In a device of the class described, a barrel, a plurality of disks in the barrel, means for supporting the barrel on a vehicle, a plunger slidable in the barrel, spring means for advancing the plunger to expel the disks, a casing rotatable on the barrel, latch means carried by the casing and engaging the plunger to hold the plunger retracted, impact-operated means for rotating the casing to disengage the latch means from the plunger, and mechanism for retaining the disks in the barrel until the plunger is advanced.

2. A device of the class described, constructed as set forth in claim 1, and further characterized by the fact that said mechanism embodies a closure for the barrel, means for retaining the closure detachably on the barrel, and means carried by the casing and cooperating with the closure for loosening the closure with respect to the barrel when the casing is rotated.

3. In a device of the class described, a barrel, a plurality of disks in the barrel means for supporting the barrel on a vehicle, a plunger slidable in the barrel, spring means for advancing the plunger to expel the disks, a casing rotatable on the barrel, latch means carried by the casing and engaging the plunger to hold the plunger retracted, impact operated means for rotating the casing to disengage the latch means from the plunger to secure an expulsion of the disks, a second latch means forming a detachable connection between the plunger and the barrel, and operating to prevent rotation of the casing on the barrel, the second latch means being under the control of an operator, and mechanism for retaining the disks in the barrel until the plunger is advanced.

4. In a device of the class described, a barrel, a plurality of disks in the barrel, means for supporting the barrel on a vehicle, a plunger slidable in the barrel, spring means for advancing the plunger to expel the disks, a casing rotatable with respect to the barrel, a first latch means connecting the casing and the plunger to hold the plunger retracted, impact operated means for rotating the casing to disengage the latch means from the plunger, and to secure an expulsion of the disks, means releasably under the control of an operator for holding the casing against rotation with respect to the barrel, and mechanism for retaining the disks in the barrel until the plunger is advanced.

In testimony that we claim the foregoing as our own, we have hereto affixed our signatures.

ANTHONY ROTH.
JOSEPH W. ROTH.